United States Patent [19]

Ford

[11] 4,453,225

[45] Jun. 5, 1984

[54] COUNTERACTING THE EFFECT OF PHASE SHIFT CHANGES BETWEEN TWO QUANTITIES IN EXTRACTING THEIR RATIO

[75] Inventor: Michael A. Ford, Buckinghamshire, England

[73] Assignee: Perkin-Elmer Limited, Buckinghamshire, England

[21] Appl. No.: 241,348

[22] Filed: Mar. 6, 1981

[30] Foreign Application Priority Data

Mar. 7, 1980 [GB] United Kingdom ................ 8007813

[51] Int. Cl.³ .............................................. G01J 3/42
[52] U.S. Cl. .................................... 364/525; 364/551; 356/323; 356/325
[58] Field of Search ............... 364/498, 525, 551, 761; 356/323, 324, 325, 434

[56] References Cited

U.S. PATENT DOCUMENTS

| | | | |
|---|---|---|---|
| 3,242,797 | 3/1966 | Sundstrom | 356/325 |
| 3,659,942 | 5/1972 | Vergato | 356/325 |
| 3,825,762 | 7/1974 | White | 356/324 |
| 3,981,586 | 9/1976 | Scott | 356/323 |
| 4,079,256 | 3/1978 | Ford et al. | 356/325 |
| 4,132,481 | 1/1979 | Ford et al. | 356/325 |
| 4,180,327 | 12/1979 | Maeda et al. | 356/325 |
| 4,305,663 | 12/1981 | Perkins et al. | 356/325 |
| 4,306,295 | 12/1981 | Caroc | 364/551 |

*Primary Examiner*—Gary Chin
*Attorney, Agent, or Firm*—F. L. Masselle; E. T. Grimes; R. A. Hays

[57] ABSTRACT

The accuracy of the ratio between two time-varying quantities represented by electrical signals, such as the sample transmission (or absorption) signal and the reference signal in a double-beam, ratio-recording, infrared spectrophotometer, is impaired if the electrical signals are subject to inconstant phase shifts. The present invention counteracts the effect of phase shift variations, whatever their origin, by alternately reversing the order in which an elemental component of one quantity is made to occur with respect to an elemental component of the other quantity so that the said effect reverses in sign when the order is reversed and substantially cancels out when the respective elemental portions are combined to form the numerator and the denominator of the ratio. The invention is particularly described with reference to a spectrophotometer of the type referred to.

21 Claims, 11 Drawing Figures

COUNTERACTING THE EFFECT OF PHASE SHIFT CHANGES BETWEEN TWO QUANTITIES IN EXTRACTING THEIR RATIO

BACKGROUND OF THE INVENTION

This invention relates to method of and apparatus for producing an electrical output signal expressing the ratio between two quantities and involves the generation of a composite electrical signal comprising elemental portions of a signal component representing one quantity alternating with elemental portions of another signal component representing the other quantity so that two series of elemental portions are set up both of which are subject to variable phase shift, provision being made for enabling the said ratio to be computed with substantial cancellation of the adverse effect of said variable phase shift on ratio accuracy.

The invention relates in particular to method of and apparatus for double-beam, ratio-recording, infrared spectrophotometry in which the composite electrical signal is generated by means including a detector which is either of the thermal type, e.g. thermo-couple, or has a signal rise characteristic similar to that of the thermal type.

The generality of the present invention is more readily appreciated in the specific context of the spectrophotometric application referred to in the above statement.

In double-beam, ratio-recording spectrophotometry, the thermo-couple is still the preferred choice for the photometric detector in that its performance, particularly at the long wavelengths of the infrared spectrum, is generally superior to that of any other device that could be considered in practice, including the newly developed pyroelectric detectors. Unfortunately, any thermal detector requires a finite time to heat up and cool down, which inevitably means that the electrical signal it produces lags behind the change in the impinging radiation that has caused it. For the purposes of the present discussion, it will be assumed that detection of the photometric radiation is performed by a thermo-couple.

In the spectrophotometric process under review, the detector is exposed, for equal intervals of time, to the radiation emerging alternately from the sample optical channel and the reference optical channel, with the result that the detector signal includes an elemental portion of a signal component representing sample transmission or absorption (which identifies with one of said quantities) alternating with an elemental portion of a signal component representing reference transmission or absorption (which identifies with the other of said quantities), the two elemental portions being of equal duration. The detector signal is therefore a composite electrical signal in that it includes two distinct series of elemental portions, but because of the sluggish response of the thermo-couple, an elemental signal portion belonging to one series has not completely died away when the next following elemental signal portion of the other series begins to rise.

This leads to what is known in the art as "cross-talk" between the sample signal component and the reference signal component, which has to be taken into account when the detector signal is demodulated in order to separate the two components. In practice, cross-talk is minimized by suitably phasing the demodulation points to the beam switching means through which the detector is alternately exposed to one and other of the two optical channels. In a commercial instrument, the phasing up operation ensuring effective cross-talk cancellation is carried out at the factory but the cancellation can only be truly valid if the phase shift (or phase difference) between the optical pulse impinging upon the detector and the resulting elemental signal portion of the respective series is constant regardless, for example, of the control settings chosen by the operator of the instrument. In the present context, the phrase "phase shift variation" is intended to allude to the fact that a phase shift as defined is present and is subject to change. An important cause of said variations will be presently described.

A more detailed account of how cross-talk arises in the same general spectrophotometric context of the present discussion and of the conditions to be met in order to minimize it is found in U.S. Pat. No. 4,132,481, which is imported in full into the present application. There the disturbance to cross-talk cancellation brought about by mains frequency variations was identified for the first time and a solution given. Without in any way detracting from the generality of the present invention, it may be stated that in so far as its specific application to spectrophotometry is concerned the problem that had to be solved was how to overcome the disturbance to cross-talk cancellation brought about by variable phase shift in the generation of the elemental signal portions of the two series referred to.

There are a number of ways in which the signal generating means including the detector and the electronic system for handling its output may inevitably give rise to phase shift variations. It has been observed earlier on that in infrared spectrophotometry the detector more frequently used in the present state of the art is the thermo-couple. It typically comprises active semi-conductor material in a pair of confined areas bridged by an overlying metal foil of rectangular shape, called the "target", which covers both in length and width a significantly larger area than the total semiconductor active area. The areas are spaced apart along the longitudinal axis of the target and, in the normal operation of the spectrophotometer, they "see" a substantially constant length of the radiation strip impinging upon the target and representing the image of the monochromator exit slit, regardless of the slit opening actually chosen by the user. They do not "see" a constant width, however. In fact, at moderate openings, they are not substantially overfilled by the radiation width and at large openings they are considerably overfilled. In the first case, the radiation will only have to traverse the thickness of the foil in reaching the active areas; in the second case, it must first travel along the plane of the foil as well as traverse its thickness. This means that as the slit opening is increased the elemental signal portions referred to earlier will receive signal contributions that have had less and less time to rise because of the greater thermal impedance met (and consequently greater time delay suffered) by the radiation in reaching the active areas. As a result, the elemental signal portions of both series will rise to a lesser height in the allotted time interval than would have been the case if no significant additional thermal lag had been caused by opening the slits. If the transmission of the analytical sample relative to that of the reference is observed at a given wavenumber and a given slit opening and then at the same wavenumber but an increased opening, a signal change will take place due to a change in phase shift from that associated with the given opening to that associated with the increased opening. The said signal change is, therefore, a cause of photometric inaccuracy because if the sample is not being scanned (and we assume that it is not undergoing physical or chemical changes) there should be no change in the observed sample transmission.

Undesired phase shift variations are also introduced or compounded when the length of the radiation strip impinging on the thermo-couple is restricted, as a result for example of having to use a very small sample in a regular spectrophotometer the optics of which include no provision for restoring the radiation strip to its normal length. Inadequate emission uniformity of the radiation source is another possible cause, and so is poor phase response of the signal processing chain, the latter being a likely cause not only in spectrophotometry but also in other widely differing applications of the present invention.

It can now be appreciated that any phase shift variations, whatever their cause, must have a disturbing effect on the setting for cross-talk cancellation carried out by the manufacturer. Considering for example the slit-opening effect referred to earlier, if the setting is optimum at one moderate slit opening, it is less than optimum when the slits are opened wide, since the rise of the elemental signals will have suffered a delay and the demodulation points as set at the factory may need to be delayed further with respect to the switching of the radiation beam. This particular effect becomes increasingly more serious as the width of the target is increased, or, in other words, as wider and wider maximum openings are allowed for in instrument design. In practice, manufacturers have tended to tolerate it, confining themselves to spreading the resulting photometric error by using a slit opening intermediate between minimum and maximum in the setting up of the spectrophotometer for optimum cross-talk cancellation.

A prior art proposal (U.S. Pat. No. 3,659,942) singles out the slit-opening effect and suggests the use of a servo system which adjusts the demodulation points in response to a function of slit opening. Unfortunately, the system is in no way effective against other causes of disturbance of the cross-talk cancellation setting and in certain instances may even compound them. It does require exact foreknowledge of the detector phase response, which means that a change of detector calls for the generation of a different function of slit opening. The ideal solution would take care of any phase shift variation without even requiring any knowledge of its cause and extent. Viewed against the background of the prior art, such solution would seem most unlikely.

SUMMARY OF THE INVENTION

The object of the present invention is to provide a method of and apparatus for producing an electrical output signal expressing the ratio between two given quantities as hereinbefore referred to wherein the effect of undesired phase shift variations on the accuracy of said ratio signal is substantially cancelled whatever the causes and the extent of said variations.

The broad concept applied to the realization of the above object is the alternate reversal of the order in which an elemental portion of a signal component representing one quantity is made to occur with respect to an elemental portion of a signal component representing the other quantity so that the effect of any phase shift variations present reverses in sign when the said order is reversed and substantially cancels out when the respective elemental portions are combined to form the numerator and the denominator of the ratio.

According to one aspect of the invention there is provided a method of producing an electrical output signal expressing the ratio between two quantities, comprising the steps of causing a signal generating means to produce a composite electrical signal in which an elemental portion of a signal component representing one quantity occurs alternately with and in predetermined timed relation to an elemental portion of a signal component representing the other quantity so that said electrical signal includes two series of elemental portions, the nature of the signal generating means being such as to introduce undesired phase shift variations in the elemental portions of both series, reversing periodically the order of occurrence of the elemental portions of one series with respect to the elemental portions of the other series so that the elemental portions of one series are alternately leading and lagging the elemental portions of the other series, and computing an elemental ratio of the two quantities in which the numerator and denominator expressions each represent an elemental signal combination including two associated elemental signal portions producing opposite phase shift variation effects.

According to a further aspect of the present invention there is provided an apparatus for producing an electrical output signal expressing the ratio between two quantities, comprising:

(a) signal generating means for producing a composite electrical signal wherein an elemental portion of a signal component representing one quantity occurs alternately with, and in predetermined timed relation to, an elemental portion of a signal component representing the other quantity, with the result that said electrical signal includes two series of elemental portions, the signal generating means being such as to introduce undesired phase shift variations in the elemental portions of both series;

(b) means forming part of said signal generating means for causing the order of occurrence of the elemental portions of one series with respect to the elemental portions of the other series to be periodically reversed so that elemental portions of one series are alternately leading and lagging the elemental portions of the other series;

(c) means for (a) establishing an elemental numerator signal combination and an elemental denominator signal combination, one combination including a pair of elemental signals from one series and the other combination a pair from the other series, with the members of each pair producing opposite phase shift variation effects, and (b) ratioing the said combinations and producing an elemental ratio signal.

The signal generating means may be made to generate successive sequences of elemental signal portions in which one elemental signal portion of one series and one elemental signal portion of the other series are made to occur one after the other for equal time intervals of a given duration, the order of occurrence of one elemental signal portion with respect to the other being reversed after each sequence and the sequences being separated by a blanking interval. In this manner the mid-point of a blanking interval may be taken as the point of demarcation between two symmetrical sequences. In the context that follows, the phrase "elemental signal" will be used for "elemental signal portion" and the phrase "signal sequence" will denote a sequence of elemental signal portions as defined hereabove.

For the purpose of enabling an elemental value of the ratio to be obtained which is substantially free from the effect of phase shift variations, the successive demarcations may be tracked and the computation of the two elemental signal combinations, representing respectively elemental numerator and denominator values of said ratio, may be centred on each successive demarcation so that two homonomous (i.e. belonging to the same series) elemental signals of opposite order of occurrence, and therefore subject to phase shift variation effects of opposite sign, are included in each combination.

There is of course no need to arrange the generation of the elemental signals in such manner as to mark the points of demarcation for the purpose of obtaining the elemental value of the ratio, as long as there can be identified in the train of elemental signals successive signal sequences each of which is symmetrical to the sequence which precedes it and that which follows it. The points of demarcation may therefore be regarded as being purely notional and these can be established for the computational purposes referred to by any known means, such as electronic counting.

In a basic application of the invention, the elemental numerator and denominator combinations may be obtained by simply summing the elemental signals constituting the numerator and denominator pairs, respectively. Denoting the numerator pair as $n_1$, $n_2$ and the denominator pair as $d_1$, $d_2$, an elemental ratio signal may be produced by computing the simple expression $$\frac{n_1 + n_2}{d_1 + d_2}.$$

More sophisticated nuerator and denominator signal combinations may be required in certain applications, as will be apparent from the description of a detailed embodiment of the invention, which is to follow.

Electronic computational means are preferably used for representing the elemental signal combinations as well as the elemental ratio signal, and, optionally, translating a succession of elemental ratio signals into sustained analogue signal representing the ratio between the two quantities as hereinbefore defined. The analogue signal may be used, for example, to drive an X-Y recorder. In the case of the apparatus aspect of the invention, dedicated microprocessor-based computational means are preferred.

Both the method and the apparatus forms of the present invention, as expressed in the foregoing generalized statements, find a particular application in double-beam ratio-recording spectrophotometry, in which rotary beam control means including reflecting, non-reflecting and transmitting sectors in various suitable combinations may be used as part of the means for generating the signal sequences.

Conveniently, the beam control means is so arranged that in one revolution thereof at least two symmetrical signal sequences are generated. This could be readily accommodated in a beam chopper having six identical sectors, which we shall call "sextants" for the purposes of the present context. Two of the sextants may be reflecting, two transmitting and two opaque and non-reflecting, i.e. blanking. Assuming a given sense of rotation, by arranging for a reflecting sextant to lead a transmitting sextant and the latter in turn to lead a blanking sextant, the elemental signal sequence S (sample elemental signal)—R (reference elemental signal)—B (blank)—may be generated in the first 180 degrees of the chopper revolution. Then by arranging for a transmitting sextant to follow the blanking sextant and to be followed by a reflecting sextant, in turn followed by another blanking sextant, the sequence R—S—B may be generated in the next 180 degrees.

If we now take, say, three complete revolutions of the chopper, the following train of elemental signals results: S1; R1; B1; R2; S2; B2; S3; R3; B3; R4; S4; B4; S5; R5; B5; R6; S6; B6.

In the above signal train, B1 clearly represents the demarcation between the first occurring symmetrical signal sequences (S1;R1) and (R2; S2); B2, that between (R2; S2) and (S3; R3); B3, that between (S3; R3) and (R4; S4) and so on. B1, B2 and B3 represent, therefore, the centres of computation of successive elemental values of the sample to reference signal ratio. The first value centred on B1 could be the result of simply computing $$\frac{S1 + S2}{R1 + R2};$$

the second value, that of computing $$\frac{S2 + S3}{R2 + R3};$$

the third value, that of computing $$\frac{S3 + S4}{R3 + R4},$$

and so on. The chopper as described may be used as a post-sample chopper in a spectrophotometric arrangement wherein the sample beam and the reference beam are co-existing. In this basic example, in which a single chopper with six sectors may be used, no provision would be included for minimizing the re-radiation effect due to the heating up of the observed and reference samples. The successive elemental ratio signals may be made to produce a sustained ordinate signal for driving an X-Y recorder plotting sample transmission (or absorption) against wavenumber (or wavelength).

It should be noted that a spectrophotometric chopper provided with six sectors as described is believed to be novel per se. Although it is not the only form of chopper that would satisfy the requirements of the present invention, it is the preferred device, particularly where an alternative device would involve an excessive number of sectors, e.g. an eight-sector chopper. In the example given, and indeed in any chopper, it is a matter of design whether the elemental sample signal is associated with the reflecting sector and the elemental reference signal with the transmitting sector or vice versa.

Although the elemental portions of the same series are expected to be generated in equal time intervals, different generation times may be used as between elemental portions of one series and those of the other series. In the spectrophotometric application, it is preferred to have all the elemental portions of equal duration.

A double-beam ratio recording spectrophotometer will now be described in some detail as an example of how the present invention may be carried into effect, reference being had to the accompanying diagrammatic drawings.

DETAILED DESCRIPTION OF THE INVENTION

The embodiment about to be described in detail illustrates the application of the present invention to a double-beam, ratio-recording, infrared spectrophotometer incorporating a dedicated microcomputer based on a microprocessor. The description will serve to illustrate both the method and the apparatus aspects of the invention.

A spectrophotometer as specified is, of course, a complex instrument comprising many interrelated parts. However, for the present purposes there may be broadly distinguished an optical layout and an electrical layout including a signal processing system. The function of the optical layout is to produce successive strip-like patches of photometric radiation upon the sensitive area of a detector as a result of a radiation beam issuing from a radiation source being alternated between a sample optical channel and a reference optical channel situated between the source and the detector. The function of the signal processing system is to amplify and process the detector output in order to generate an electrical signal which represents the ratio between sample transmission (or absorption) and reference transmission (or absorption).

Figure 1:
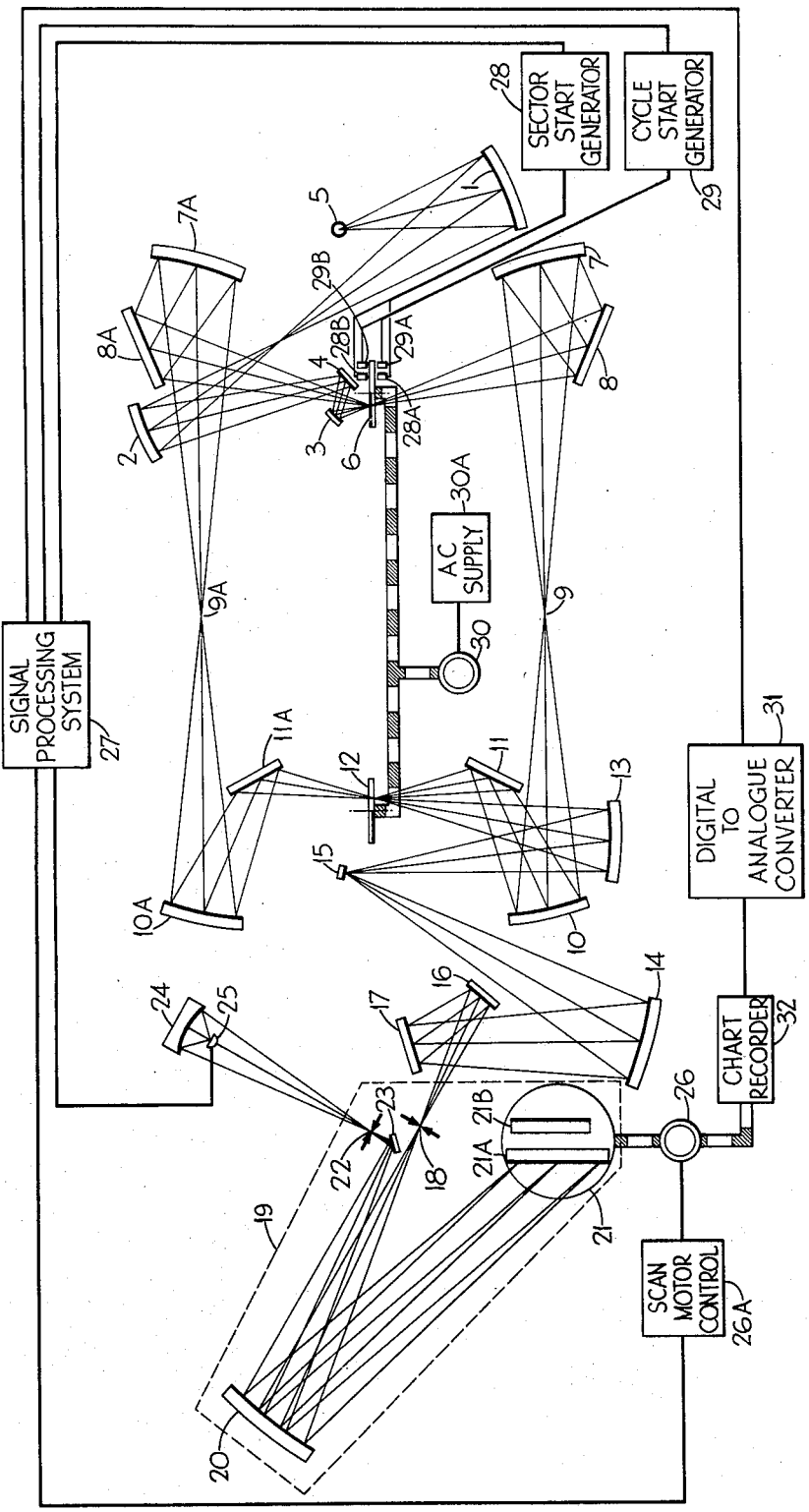
FIG. 1 illustrates the optical and electrical layout of the spectrophotometer.
Figure 2:
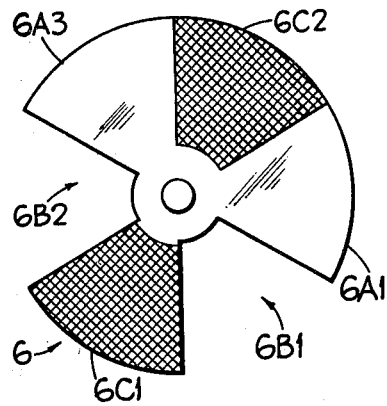
FIG. 2 depicts a six-sector pre-sample chopper.

In the optical layout shown diagrammatically in FIG. 1, toroidal mirrors 1, 2 and 3 and flat mirror 4 co-operate to project the image of the photometric source 5 at a plane coincident with the working face of a beam-dividing rotary mirror 6 (hereinafter briefly referred to as pre-sample chopper 6), which represents a generally disc-like beam switching device having straight-through-air sectors, reflecting sectors and blanking sectors. In FIG. 1 the reflecting surface of a reflecting sector is denoted by a thick line and a straight-through-air sector by a thin line. A blanking sector cannot be simultaneously indicated for a reason that will become apparent when FIG. 2 is considered.

The pre-sample chopper 6 is mounted for rotation around an axis passing through its centre and parallel to the plane of the paper. Depending on whether the projected image of the source 5 encounters a straight-through-air sector or a reflecting sector, it will gain unimpeded access to the sample optical channel or it will be reflected into the reference channel. It is clear, therefore, that the function of the pre-sample chopper 6 is to switch the beam from the source 5 alternately into the sample and reference channels, i.e. it effectively time divides the beam.

The sample channel comprises toroidal mirror 7 and plane mirror 8 for relaying the said projected image to the mid-plane of the sample station 9 and also comprises toroidal mirror 10 and plane mirror 11 for further relaying the said image to a plane coinciding with the working face of a beam-recombining rotary mirror 12 (hereinafter briefly referred to as post-sample chopper 12), which represents a generally disc-like beam switching device having reflecting sectors alternating with straight-through-air sectors.

The reference channel is of symmetrical layout, to ensure as far as possible identical handling of the photometric beam routed through the sample and reference, respectively. It comprises, therefore, optical elements 7A to 11A, each of which is the counterpart of the element already described bearing the same numerical reference but unaccompanied by the letter A.

The two sample choppers are integral in motion and so phased that when the photometric beam encounters a straight-through-air sector in the pre-sample chopper 6 it will simultaneously encounter a reflecting sector in the post-sample chopper 12. It has been observed that the pre-sample chopper 6 alternately routes the photometric beam into the sample and reference channels, i.e. it acts as a beam divider. The chopper 12 routes the beam alternately emerging from the sample and reference channels along a common path, i.e. it acts as a beam recombiner. In fact, whether a straight-through-air sector at a reflecting sector occurs in post-sample chopper 12, the image of the photometric source 5 relayed to the plane coinciding with the working face of post-sample chopper 12 is relayed by toroidal mirrors 13 and 14 co-operating with plane mirrors 15, 16 and 17 to the entrance slit 18 of the monochromator diagrammatically represented within the dotted frame 19.

Within the monochromator 19, collimating mirror 20 receives the photometric radiation from the entrance slit 18, located at its focus, projects the radiation in the form of a parallel beam onto a grating 21A and focusses the parallel beam bouncing back from the grating 21A onto the monochromator exit slit 22 via plane mirror 23. Finally, an ellipsoidal mirror 24 relays, with suitable demagnification, the image formed at the exit slit 22 onto the sensitive area of a photometric detector 25, which therefore receives image elements of the photometric source conveyed by the photometric beam after passing alternately through the sample optical channel and the reference optical channel. The width of the image elements is of course governed by the monochromator slit width chosen by the operator, which is normally the same for both slits; the height is governed by the slit height, which is fixed.

The grating 21A, within monochromator 19, is fixed perpendicularly to a grating table 21, parallel to the plane of the paper and rotatable around an axis at right angles to the paper. A stepper motor 26 supplied with drive pulses and control pulses from unit 26A turns the grating table 21 round between two predetermined limits representing the wavelength scan limits for the particular grating used. A grating has only a limited range and in order that the spectrophotometer may be made to cover an adequate region of the spectrum a number of gratings may be so organized that as one reaches the end of its range another is ready to take over, until all the gratings have played their part. This is indicated in FIG. 1 by showing a second grating 21B mounted back to back with respect to grating 21A but no detail is shown of how the two gratings co-operate since the actual construction of the monochromator has no bearing on the present invention and the means for switching the gratings are known per se.

As the grating 21A is caused to rotate slowly and at constant rate between its scan start and scan end limits, the wavelength of the radiation reaching the detector is scanned. The detector 25, which is a thermocouple, produces an electrical output the amplitude of which is related at any instant to the elemental region of the infrared spectrum scanned at that instant. It means, therefore, that the motion of the scan motor 26 represents the abscissa and the output of the detector the ordinate.

The detector output is processed through the digital signal processing system 27 which receives a control signal from a chopper sector pulse generator 28, co-operating with lamp 28A and photocell 28B, and another control signal from chopper cycle pulse generator 29, co-operating with lamp 29A and photocell 29B, referenced to the constant speed motor 30 for driving both choppers. Motor 30 is fed from AC supply 30A.

The chart advance mechanism of a strip chart X-Y recorder 32 is driven by the scan motor 26 and the output of the signal processing system 27 representing the ratio between sample transmission (or absorption) and reference transmission (or absorption) is converted from digital to analogue form in unit 31 from which it is extended to the servo mechanism that drives the pen of recorder 32 across the chart. The trace left on the chart plots therefore the said ratio against wavelength scan. In practice, it is found more convenient to mark the chart abscissa with a wavenumber scale. The processing system 27 controls the scan motor 26 via the unit 26A.

In FIG. 1, the detector 25, the signal processing system 27, together with pulse generators 28 and 29 form part of a signal generating means which as a result of the beam dividing and recombining effected by the pre-sample chopper 6 and post-sample chopper 12, respectively, produces an electrical photometric signal wherein an elemental portion of a signal component representing sample transmission (or absorption) occurs alternately with, and in predetermined timed relation to, an elemental portion of a signal component representing reference transmission (or absorption). The photometric signal, therefore, comprises two series of elemental portions: the sample series and the reference series. An elemental portion of the sample series clearly occurs when there is an open optical path through the sample channel to the detector and similarly for the reference series. The periods during which one or other path is open are naturally governed by the sectors of the two choppers 6 and 12. Because of the time lag between the photometric radiation impinging upon the thermal detector and the corresponding elemental signal being generated cross-talk is set up between the elemental portions of the sample series and the elemental portions of the reference series, which is subject to change as a result of phase shift variations affecting the elemental portions of both series.

In common with all infrared spectrophotometers, the instrument represented in FIG. 1 must face up to the problem that the sample and the reference heat up and re-radiate spurious energy which upon reaching the detector impairs photometric accuracy.

U.S. Pat. No. 4,132,481 deals at length with the cross-talk effect and describes a practical embodiment wherein the setting for minimum cross-talk predetermined by the manufacturer is safeguarded against the unstabilizing effect of mains frequency variations and at the same time substantial cancellation of the re-radiation effect is provided.

The present embodiment is primarily concerned with minimizing the unstabilizing effect on the cross-talk setting brought about by phase shift variations introduced in the generation of the ordinate signal in the normal operation of the spectrophotometer. The embodiment achieves its primary object and deals with the re-radiation effect at the same time, thus producing an ordinate signal reflecting an improved photometric accuracy.

Figure 3:
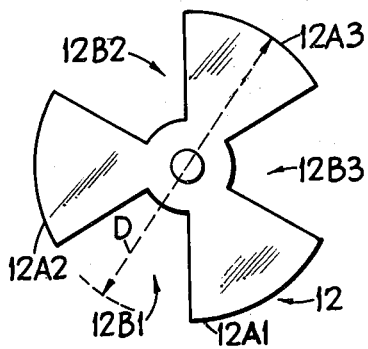
FIG. 3 depicts a six-sector post-sample chopper.

Means will now be described, forming part of the signal generating means, for enabling the order of occurrence of the elemental portions of the sample series with respect to the elemental portion of the reference series to be periodically reversed so that the elemental portions of one series are alternately leading and lagging the elemental portions of the other series. In the present embodiment, such means include the pre-sample chopper 6 and the post-sample chopper 12 as illustrated in FIGS. 2 and 3 respectively. The construction of the two choppers and the differences between them are more readily appreciated by referring to FIG. 3 first. In FIG. 3 the post-sample chopper 12 may be imagined as having been obtained by marking out 6 identical sectors on an optically flat face of a glass disc having a diameter D, cutting out three sectors and front-aluminizing the remaining sectors, thus defining reflecting sectors 12A1, 12A2 and 12A3 and straight-through-air regions (hereinafter referred to as straight-through-air sectors) 12B1, 12B2 and 12B3. This construction represents a departure, in photometric terms, from the conventional spectrophotometric choppers in which each sector represents a quadrant. To emphasize this and underline its significance where convenient to do so, the chopper of FIG. 3 will be referred to as a sextant chopper, in contradistinction to what might be called the quadrant chopper of the prior art.

The pre-sample chopper 6 in FIG. 2 is also a sextant chopper. It differs from the post-sample chopper 12 of FIG. 3 in that one straight-through-air sector has been covered over to form an opaque non-reflecting sector and one reflecting sector has been rendered non-reflecting. References 6A1 and 6A3 identify the reflecting sectors; 6B1 and 6B2, the straight-through-air sectors; 6C1 and 6C2, the opaque non-reflecting sectors.

Figure 4:
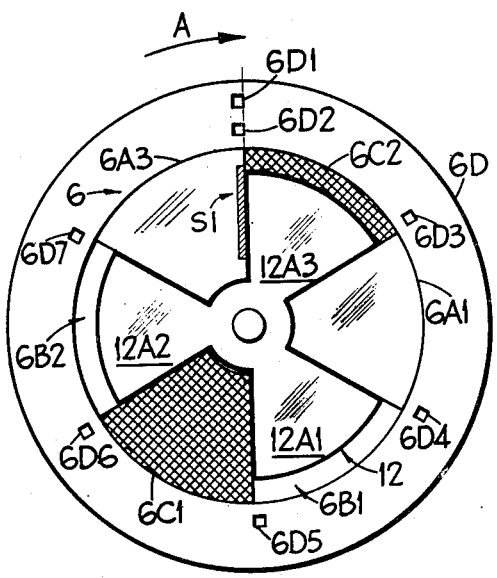
FIG. 4 is a symbolized representation of the post-sample chopper of FIG. 3 superimposed upon the pre-sample chopper of FIG. 2 to show the correct angular phasing therebetween.

In FIG. 4, the post-sample chopper 12 of FIG. 3 has been drawn superimposed upon, and to a smaller scale than, the presample chopper 6 of FIG. 2 in order to illustrate the angular phasing of the two choppers as referred to earlier in the description of the present embodiment. The constant-speed motor 30 (FIG. 1) will therefore drive the two sextant choppers at a predetermined constant speed in the phase relationship illustrated in FIG. 4. The image of the photometric source 5 (FIG. 1) projected at the working plane of each sextant chopper is symbolized by the cross-hatched rectangular patch SI. If it is now assumed that the direction of rotation of the two sextant choppers is that shown by the arrow A, it is possible to trace the results, in terms of the electrical output waveform of the detector 25 (FIG. 1), of rotating the sextant choppers through a complete revolution from the angular position depicted in FIG. 4, wherein the leading edge of sector 6A3, of the pre-sample chopper 6 has begun to cross the radiation patch SI. Bearing in mind what was said with reference to FIG. 1 on the way in which the photometric beam is first divided and alternated between the sample and reference channels and is then re-combined along a single path, the detector 25 must receive photometric radiation and re-radiation from the sample channel from the instant "frozen" in FIG. 4 to the instant when the trailing edge of sector 6A3 leaves the radiation path SI. If we denote the sample signal from the detector as S and the re-radiation signal as s, S+s represents the first elemental portion of the sample series.

After one sixth of a revolution has been completed, the patch SI will fall onto the leading boundary of the straight-through-air sector 6B2, with the result that the detector 25 will receive photometric radiation and re-radiation from the reference channel. Denoting the detector reference signal as R and the re-radiation signal as r, R+r represents a first elemental portion of the reference series.

After a further 60 degrees, the patch SI will begin to fall on the leading edge of the opaque non-reflecting sector 6C1. The detector 25 will now receive re-radiation energy only from the sample channel. The sample re-radiation signal forming the detector output is denoted by s.

After a further 60 degrees, the patch SI will begin to fall onto the straight-through-air sector 6B1. The detector 25 will now receive photometric radiation and re-radiation from the reference channel. The resulting detector signal will now be R+r again.

After a further 60 degrees, the reflecting sector 6A1 will begin to cross the patch SI. The detector signal will again be S+s.

After the terminal 60 degrees of a complete revolution the opaque and non-reflecting sector 6C2 will cut across the patch SI causing re-radiation from the reference channel to fall upon the detector. The detector signal is now denoted by r and one chopper cycle has been completed.

So in one chopper cycle the output of the detector 25 will comprise elemental signal portions in the order S+s, R+r, s, R+r, S+s, r. The order will naturally be repeated at each subsequent complete revolution from the angular position shown in FIG. 4, where SI represents a fixed datum. It will be noted that in the chopper arrangement as described a pre-sample chopper sector is uniquely associated with a given elemental signal. Starting with the sector 6A3, this corresponds to the elemental signal S+s; sector 6B2 to R+r; sector 6C1 to s; sector 6B1 to R+r; sector 6A1 to S+s; and sector 6C2 to r.

Figure 5:
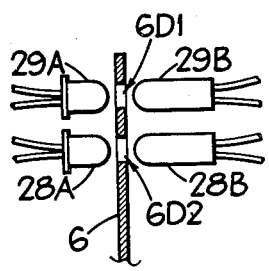
FIG. 5 represents means co-operating with the pre-sample chopper of FIG. 4 for generating an electrical pulse at each chopper cycle and another electrical pulse at the start of each chopper sector.

It follows that if a pulse marking the start of a chopper cycle, as established by the leading edge of the leading sector in the cycle registering with a fixed datum, and six additional pulses each marking the start of a sector, as established by the leading edge of the sector considered registering with the said datum, are generated, it is possible to keep track of the elemental signal that is actually available at the output of the detector 25, while a given sector sweeps over the radiation patch SI, by counting the number of sector start pulses that have occurred from the instant by coincidence between a chopper cycle start pulse and the pulse marking the start of the leading sector. In fact, the pre-sample chopper 6 in FIG. 4 has fixed thereto an opaque annulus 6D provided with an aperture 6D1, the leading edge of which lies on the prolongation of the leading edge of the leading sector 6A3. Aperture 6D1 cooperates with a fixed light source 29A and a photocell 29B, shown in FIG. 5 (see also FIG. 1), so that as the leading edge of the aperture crosses the beam from the light source 29A, the photocell 29B generates a sharp electrical pulse marking the start of a chopper cycle, the said light beam representing the datum, of course. On a circle inward of aperture 6D1 lie six other apertures 6D2 to 6D7, each with its leading edge on the prolongation of a sector leading edge when the sextant choppers are in the cycle start position and each co-operating in turn wth another fixed light source 28A and another fixed photocell 28B (shown in FIG. 5 and FIG. 1) so that as the leading edge of each of the six apertures crosses the second light beam the photocell 28B generates a sharp electrical pulse that marks the start of the chopper sector associated with the aperture considered.

In the arrangement described with reference to aperture 6D1, light source 29A and photocell 29B represent sensing means co-operating with the cycle start pulse generator 29 and in that described with reference to apertures 6D2 to 6D7, light source 28A and photocell 28B represent sensing means co-operating with the sector start pulse generator 28. The manner in which each sensing means co-operates with the associated pulse generator in order to achieve the stated function is well known in the art and need not be described in greater detail.

Figures 6, 6A:
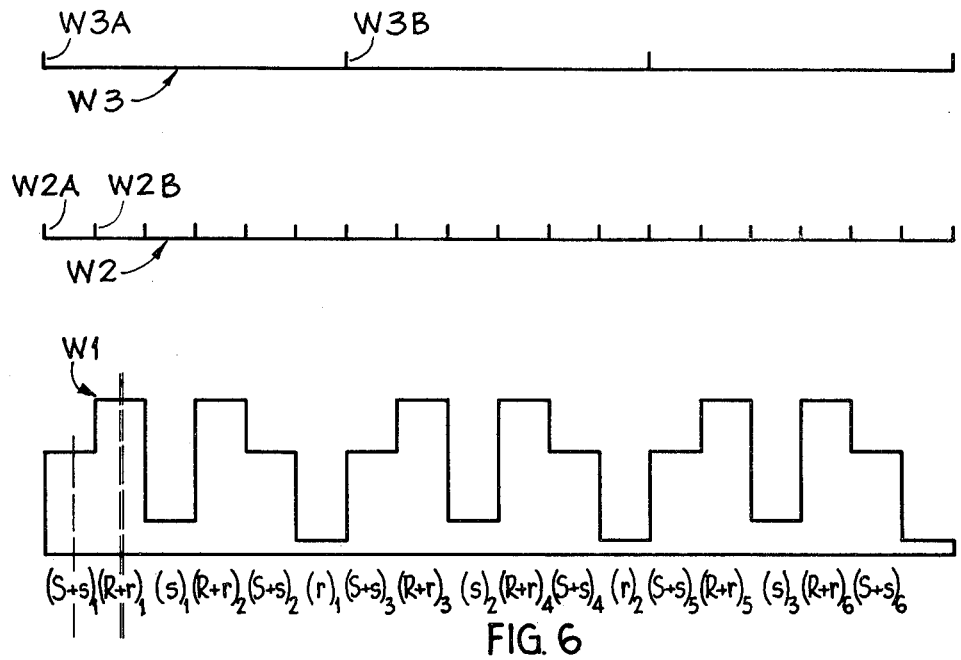
FIG. 6 represents the idealized waveform of elemental signal portions generated by the spectrophotometer detector, in the correct time relationship to cycle start and sector start pulses.
FIG. 6A illustrates how the data is handled to effect the computation of an elemental ratio signal with the aid of a microprocessor.

The foregoing description of how the elemental signals of the sample and reference series as well as the cycle and sector start pulses are generated is summarized in the idealized curves shown in FIG. 6, wherein W1 is the idealized waveform of the output generated by the detector 25 (FIG. 1) in the course of 3 complete cycles, of the sextant choppers 6 and 12, which as said earlier are integral in motion and may therefore be imagined as locked together in the relationship shown in FIG. 4, although in fact the choppers are physically spaced apart as shown in FIG. 1. The waveform W1 is shown in its proper phase relationship to the waveform W2, representing the output of the sector start pulse generator 28, and the waveform W3, representing the output of the cycle start pulse generator 29.

Waveform W1 shows that the elemental signal portion $(S+s)_1$ is generated when the leading sector of sextant chopper 6 sweeps across the radiation patch SI (FIG. 4), the limits of the leading sector being marked by the successive sector start pulses W2A and W2B, the former appertaining to the leading sector and the latter to the next sector. The sector start pulse W2A of the leading sector is seen to coincide with the cycle start pulse W3A.

It will be noted that in one complete cycle of the sextant choppers 6 and 12, occurring between cycle start pulses W3A and W3B, first the elemental signal $(S+s)_1$ of the sample series leads the elemental signal $(R+r)_1$ of the reference series, in one half of the cycle, then the next elemental signal $(S+s)_2$ of the sample series lags behind the next elemental signal $(R+r)_2$ of the reference series in the other half of the cycle. This is repeated in each successive cycle with the result that sample series elemental signals $(S+s)_1$, $(S+s)_2$, $(S+s)_3$, $(S+s)_4$, $(S+s)_5$ etc. and reference series elemental signals $(R+r)_1$, $(R+r)_2$, $(R+r)_3$, $(R+r)_4$, $(R+r)_5$ etc. are generated in which elemental signals of the sample series alternately lead and lag behind elemental signals of the reference series.

It will be noted that first the sample re-radiation signal $(s)_1$ acts as a blanking pulse then the reference re-radiation signal $(r)_1$ and again first $(s)_2$ and then $(r)_2$, in the second cycle, and so on in each successive cycle. Inspection of the waveform W1 will also show that any $(s)$ or $(r)$ signal may be taken as a notional demarcation between two symmetrical signal sequences. For example, $(s)_1$ may stand as the demarcation between the signal sequence $(S+s)_1$, $(R+r)_1$, and the signal sequence $(R+r)_2$, $(S+s)_2$, then $(r)_1$ is demarcation between $(R+r)_2$, $(S+s)_2$ and $(S+s)_3$, $(R+r)_3$ and so on.

Before symmetrical signal sequences generated by the detector 25 (FIG. 1) may be utilized to compute an elemental ratio signal, each elemental signal must of course be integrated because in a thermo-couple detector the signal builds up over a finite time.

In U.S. Pat. No. 4,132,481, introduced earlier, it has been explained that, for reasons of cross-talk cancellation made imperative by the use of a thermal detector, the integration start of an S or R signal (or s or r) is not made coincident with the start of the optical pulse that caused the signal but is in fact delayed relative thereto by an amount which, by reason of the many variables involved, is best established experimentally.

In the embodiment included in the US patent referred to, the delay is brought about by so phasing the demodulator with respect to the post-sample chopper that each demodulation point is considerably delayed with respect to the occurrence of the leading edge of the associated optical pulse. In the present embodiment, the demodulation function is effectively performed by a microprocessor as part of computing the elemental numerator signal combination and the elemental denominator signal combination, the microprocessor receiving an input from an integrator which handles the undemodulated output from the detector 25 and is triggered by each sector start pulse from generator 28 (FIG. 1) via a delay unit, as we shall presently refer to in greater detail.

It is now clear that when we refer to the demarcation between two symmetrical signal sequences in the present embodiment we must take into account the integration delay. For example, if in the waveform W1 of FIG. 6 we consider the demarcation associated with $(s)_2$, the actual point in time at which the demarcation is established as a legitimate computation centre for computing thereat an elemental signal ratio does not occur when the trailing edge of the $(s)_2$ sector of the sextant chopper 6 moves away from radiation patch SI (FIG. 4) since the integration of the $(s)_2$ elemental signal will continue well into the $(R+r)_4$ sector. In fact, the end of the integration of the $(s)$ or $(r)$ elemental signal is taken as the effective demarcation in the present embodiment. This should be borne in mind when reference is made to either elemental signal being used as a demarcation.

Inspection of the waveform W1 in FIG. 6 shows that in the present embodiment there are two demarcations in each chopper cycle (as shown by relating W1 and W2 in FIG. 6), which means that two data points, i.e. elemental ratio signals, of the ordinate (transmission or absorption) are generated during each cycle. Since the elemental signals are generated sequentially, the computation of a data point cannot be effected until all the required signals are available simultaneously. It follows that the demarcation actually occurring must represent the centre at which the computation is made and the preceding demarcation the centre on which it is based. In other words, a computation timed to occur in correspondence of a demarcation associated with an $(s)$ signal is actually centred on the preceding $(r)$ signal, and vice versa. If the computation is centred on $(r)$, we may apply the following general notation to denote the signal sequences involved:

$$(s)\ (R+r)\ (S+s)\ (r)\ (S+s)_{sym}\ (R+r)_{sym}\ (s)_{sym} \qquad (I)$$

and, similarly, if the computation is centred on $(s)$ $$(r)\ (S+s)\ (R+r)\ (s)\ (R+r)_{sym}\ (S+s)_{sym}\ (r)_{sym} \qquad (II)$$

wherein the suffix "sym" denotes that the elemental signal belongs to a signal sequence which is symmetrical to an immediately preceding signal sequence (and, of course, to an immediately following signal sequence.)

Now, after integration of each elemental signal, there may be computed in each case; (1) a numerator elemental signal combination by adding two integrated sample elemental signals and subtracting from the sum the integrated sample re-radiation elemental signals and (2) a denominator elemental signal combination by adding two integrated reference elemental signals and subtracting from the sum the integrated reference re-radiation elemental signals. This means that the elemental signal ratio for centre on $(r)$ is given by:

$$\frac{\int(S+s) + \int(S+s)_{sym} - \int(s) - \int(s)_{sym}}{\int(R+r) + \int(R+r)_{sym} - 2\int r} \qquad (III)$$

and the elemental signal ratio for centre on $(s)$ by:

$$\frac{\int(S+s) + \int(S+s)_{sym} - 2\int s}{\int(R+r) + \int(R+r)_{sym} - \int(r) - \int(r)_{sym}} \qquad (IV)$$

The expression (III) will be computed at the next following demarcation associated with $(s)$ and expression (IV) at the next following demarcation associated with $(r)$. Clearly we need to know a priori whether (a) a demarcation has occurred and (b) whether it is associated with $(s)$ or $(r)$ so that we may apply (III) or (IV), respectively. Reference to FIGS. 6 and 6A establishes that the $(r)$ signal is associated with a cycle start pulse occurring while the $(r)$ signal is being integrated and the $(s)$ demarcation is associated with a sector start pulse occurring while the $(s)$ signal is being integrated, the sector start pulse being the third counting from the cycle start pulse. It means that both (a) and (b) can be readily established by a simple operation of electronic counting performed by the microprocessor presently to be introduced. Naturally, the seven integrated elemental signals of expression (III) making up a pair of signal sequences symmetrical about (r) must be stored so that they are available simultaneously at the next occurring (s) demarcation. Similarly, of course, for the seven integrated elemental signals in expression (IV), which, however, are symmetrical about (s) and must be stored to be simultaneously available at the next occurring (r) demarcation.

Figure 7:
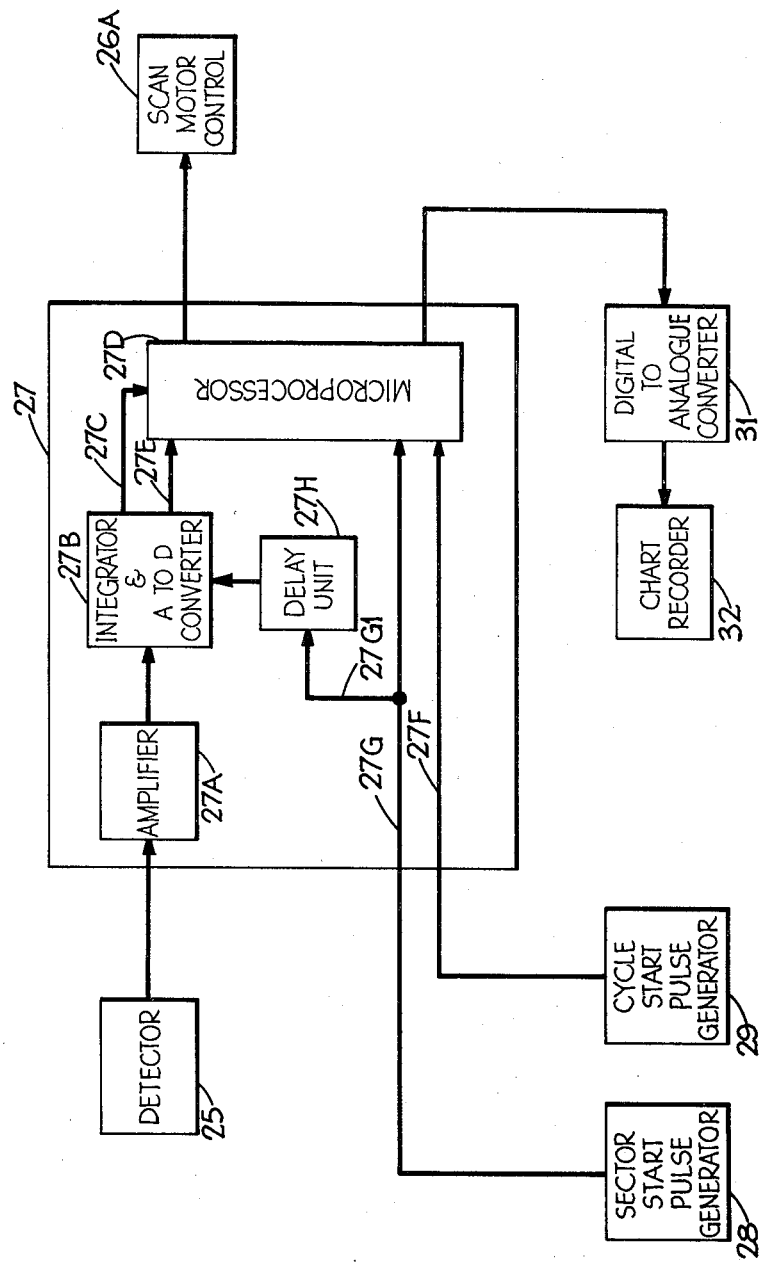
FIG. 7 gives details of the signal processing system included in the electrical layout in FIG. 1.

Referring now to the block diagram of FIG. 7, which shows some of the parts making up the signal processing system 27 of FIG. 1, the elemental signals generated by the detector 25 are first amplified by the amplifier 27A and then integrated and converted from analogue to digital form by the integrator and A to D converter unit 27B, which upon completion of each elemental signal integral issues a "ready" signal on route 27C (this and other arrowheaded lines are functional routes and not individual conductors) to the microprocessor 27D to enable it to take the integral into its internal digital score via route 27E. Timing pulses, required for the electronic counting purposes referred to earlier, are also extended to the microprocessor 27D from cycle start pulse generator 29 and sector start pulse generator 28 on routes 27F and 27G, respectively. A route 27G1, branching from route 27G, supplies sector start pulses to the unit 27B, via a delay unit 27H, each pulse from unit 27H thus timing the integration start of an elemental signal with a predetermined delay (to be specified later) from the occurrence of the associated sector pulse.

In FIG. 6A a digital store assumed to form part of the microprocessor 27D is symbolized by a column DS of 7 rectangles $m_1$ to $m_7$ representing the seven memories required for storing the seven integrated elemental signals of expressions (III) or (IV). The column DS is repeated as many times as there are elemental signals represented in FIG. 6, the object being to illustrate the manner in which the integral of each elemental signal is read into and passed through the single 7-memory store DS. Each column therefore reveals the data entered in each of memories $m_1$ to $m_7$ as the integral of each elemental signal becomes available.

The symbol $\int S_1$ at the head of the leftmost column denotes in abbreviated form ($S_1$ stands for $(S+s)_1$) the integral of the elemental signal $(S+s)_1$. Similarly, $\int R_1$, denotes the integral of $(R+r)_1$ at the head of the second column from left to right, and so on. The integral shown at the head of each column will be read into the store DS soon after that integral becomes available at the output of unit 27B (FIG. 7). The integration period in the leftmost column is represented by a vertical line marked $L_{s1}$ (start limit) and a vertical line marked $L_{e1}$ (end limit). In the second column the limits are $L_{s2}$ and $L_{e2}$, and so on.

FIG. 6A has been drawn in a predetermined phase relationship to FIG. 6, with the prolongation of $L_{s1}$ bisecting the idealized elemental waveform for $(S+s)_1$ and that of $L_{e1}$ just short of bisecting the elemental waveform for $(R+r)_1$. Similarly, in the next column, the prolongation of $L_{s2}$ bisects $(R+r)_1$ and that of $L_{e2}$ is just short of bisecting $(s)_1$. The pattern is repeated with $L_{s3}$ bisecting $(s)_1$ and so on.

It is opportune to specify at this juncture that the constant speed motor 30 (FIG. 1) for driving sextant choppers 6 and 12 (FIG. 1) is in fact a synchronous motor turning at 500 revolutions per minute when run from a 50 Hz AC supply. Thus, each chopper cycle is completed in exactly 6 supply cycles and each sector takes exactly 20 milliseconds from the instant its leading edge enters the radiation patch SI (FIG. 4) to the instant its trailing edge leaves it.

The unit 27H (FIG. 7) is arranged to provide whatever delay may be required for effecting cross-talk cancellation, but since 10 milliseconds is a good average this FIGURE will be assumed for purposes of the present description, particularly with reference to FIG. 6A. The stated delay accounts therefore for the bisecting of each elemental signal waveform by the prolongation of the associated start limit line. Within the unit 27B the integration is timed to last some 18 milliseconds, which accounts for the prolongation of the end limit line falling short of bisecting the associated elemental signal waveform. The 2 milliseconds or so intervening between an end limit line and the next start limit line, e.g. between $L_{e1}$ and $L_{s2}$, is used for A to D conversion, updating of the store and, if a demarcation has been reached, effecting a computation based on (III) or (IV), whichever happens to apply. Since the elemental signal to be integrated next is different from the one just integrated, there is in practice no need to perform these operations within the 2 milliseconds or so before the next integration interval commences. In particular, where the expressions to be computed by the microprocessor are much more complex than (III) or (IV), it would be expendient to use the said integration interval instead.

Within the microprocessor 27D (FIG. 7) provision is included for counting 6 sector start pulses (FIG. 6 waveform W2) from the instant of coincidence between a cycle start pulse (FIG. 6 waveform W2 and waveform W3) and a sector start pulse up to and excluding the next coincidence, when the count is resumed from 1 once again. Provision is also included for tracking every third sector start pulse.

It will be assumed now, bearing FIGS. 6, 6A and 7 in mind, that the spectrophotometer has been switched on and, although elemental signals $(S+s)_1$ and $(R+r)_1$ have been generated, the first integral to become available is $\int s_1$. The microprocessor 27D is so controlled that in the 2-millisecond interval between $L_{e3}$ and $L_{s4}$, $\int s_1$ is read into memory $m_1$. In the next 2-millisecond interval, between $L_{e4}$ and $L_{s5}$, $\int s_1$ is transferred to $m_2$ and $\int R_2$ is read into $m_1$. In the next interval, $\int s_1$ is transferred to $m_3$, $\int R_2$ is transferred to $m_2$ and $\int S_2$ is read into $m_1$, and so on with the transfer of each memory content to the memory next following in numerical order being followed by the reading of the most recent integral into the first memory $m_1$.

Clearly when the spectrophotometer is first switched on no meaningful computation of an elemental ratio signal can be effected until all the memories are filled and a demarcation occurs. In FIG. 6A the first valid computation, centred on $(r)_1$ is made in the interval between $l_{e9}$ and $L_{s10}$ after the integration of the $(s)_2$ signal, i.e. after the occurrence of the third sector pulse in the second chopper cycle (FIG. 6) and this, as observed earlier, must mean that expression (III) is computed. The next valid computation is made in the interval between $L_{e12}$ and $L_{s13}$. This time it is centred on $(s)_2$ and is effected after the pulse marking the start of the third cycle. Therefore, the expression (IV) is computed.

Upon the occurrence of each successive elemental signal after the digital store DS is first filled, the data stored in memory $m_7$ is overwritten with the data transferred from $m_6$. The lost data is no longer of any significance, however.

The elemental ratio signals computed by the microprocessor in digital form after each cycle start pulse and each third sector start pulse are routed to the Digital to Analogue converter 31, the output of which drives the recorder 32.

Figure 8:
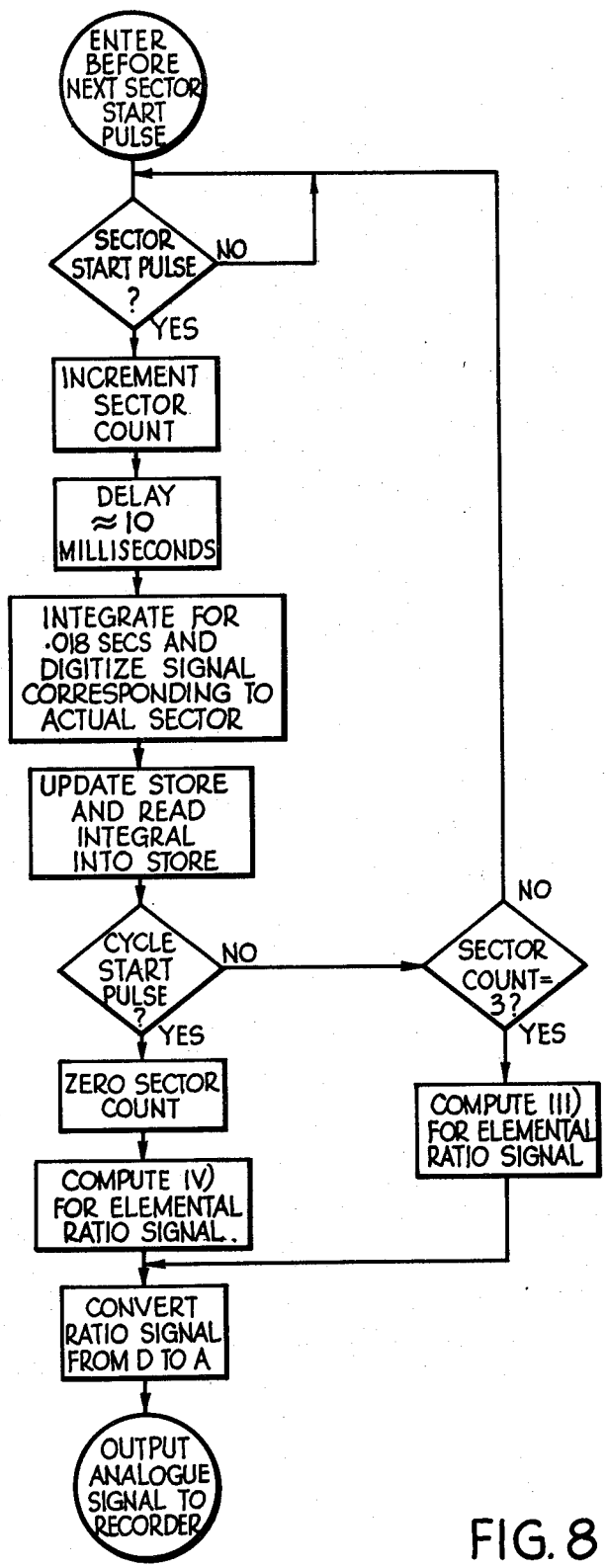
FIG. 8 is a flow chart relating to the operations described with reference to FIG. 6A.

In view of the foregoing description of the signal processing that more directly relates to the present invention, with reference to FIGS. 6 and 6A, the flow chart diagram of FIG. 8 is self-explanatory. The skilled in the art would regard it a trivial task to implement the flow chart in terms of software designed for any suitable microprocessor such as the Motorola 6800, which has in fact been used in constructing the embodiment herein described. The Motorola 6800 literature is imported into the present application.

Figure 9:
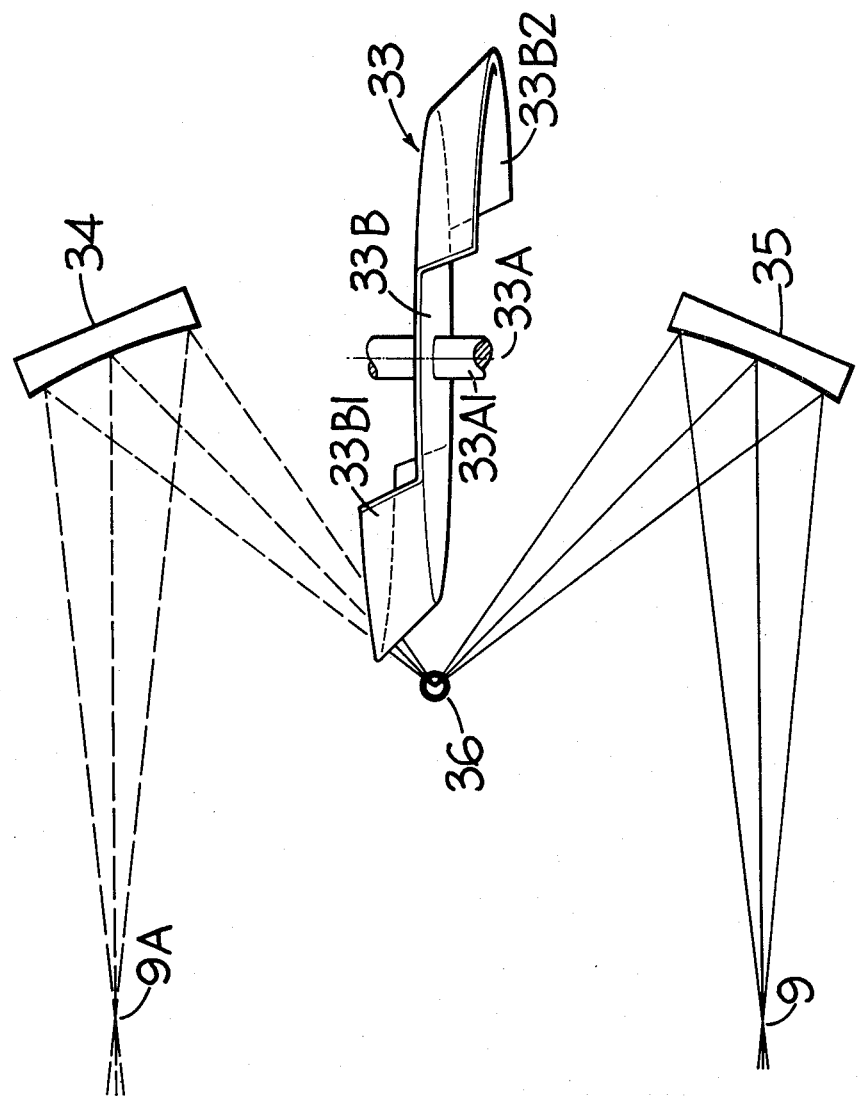
FIG. 9 illustrates the use of a pre-sample rotary shutter in conjunction with the post-sample chopper of FIG. 3 as an alternative to the use of the pre-sample chopper of FIG. 2 with the post-sample chopper of FIG. 3.

A possible alternative to the photometric-beam control arrangement embodying sextant choppers 6 and 12, as described with reference to FIGS. 1 to 4, is illustrated in FIG. 9, wherein the rotary shutter 33 replaces the pre-sample chopper 6 and the presample optical layout is modified to suit in order to produce sample and reference beams equivalent to those formed by toroidal mirrors 7 and 7A in FIG. 1.

The shutter 33, mounted for rotation around axis 33A of shaft 33A1 parallel to the plane of the paper, comprises an aluminium disc portion 33B from which there are circumferentially offset oppositely oriented part-frusto-conical flanges 33B1 and 33B2, spaced 60 degrees apart and each extending from a 120-degree sector of the disc portion 33B.

Symmetrically disposed with respect to the mid-plane of the shutter 33 are two flanking toroidal mirrors 34 and 35, positioned with respect to a radiation source 36, similar to source 5 in FIG. 1, so as to image the source along spaced optical paths, matching their counterpart in FIG. 1, at the mid-plane of the sample station, indicated at 9, and the mid-plane of the reference station, indicated at 9A.

As the shutter 33 rotates around the axis 33A, the radiation from the source 36 to the mirror 34 is intercepted by the flange 33B1 and that to the mirror 35 by the flange 33B2, with the result that for 120 degrees of the shutter revolution the sample beam is interrupted and for the symmetrical 120 degrees the reference beam is interrupted. As shown in FIG. 9, the shutter 33 interrupts the reference beam. In the 120 degrees (60×2) intervening between the flanges, neither beam is interrupted. The shutter 33 and the post-sample chopper 12 are made integral in motion, as indicated in FIG. 1 for choppers 6 and 12, and are driven by motor 30 (FIG. 1). In fact, the arrangement shown in FIG. 9 may be used in place of the pre-sample optical layout shown in FIG. 1.

Figure 10:
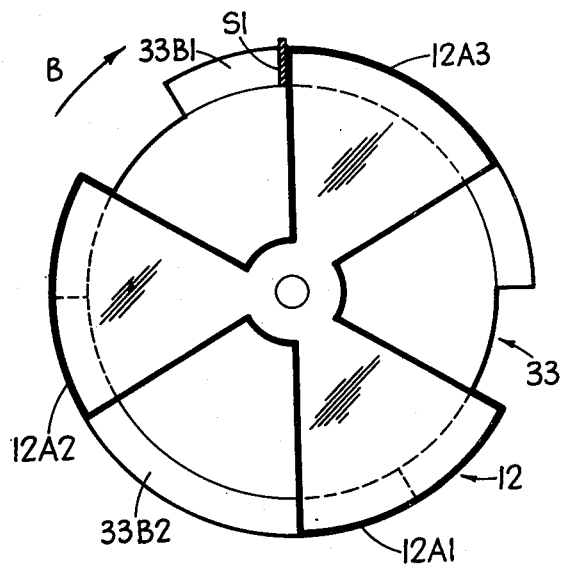
FIG. 10 is a symbolized representation of the post-sample chopper of FIG. 3 superimposed on the rotary shutter of FIG. 9 in order to illustrate the angular phasing therebetween.

As in the case of the choppers 6 and 12, the shutter 33 and the chopper 12 must be set in the proper angular phasing to enable the required elemental signals to be generated. The phasing is represented in FIG. 10, wherein the shutter 33 and the chopper 12 are shown superimposed in the fashion of FIG. 4. It must be understood that the representation is highly diagrammatic.

In FIG. 10, SI is the patch of radiation which must be taken as the image of the source 36 (FIG. 9) at the plane including the reflecting surfaces of the chopper 12 (the outline of which has been deliberately drawn in heavier lines) and the six sectors of chopper 12 correspond to the elemental signals as identified with reference to FIG. 4 (to avoid confusion only the reflecting sectors have been referenced). The instant "frozen" is the beginning of a chopper cycle with SI acting as a fixed datum. In the first 60 degrees of angular displacement in the direction of the arrow B, the detector 25 (FIG. 1) will generate $(S+s)_1$ in full (flange 33B1 cannot blank the sample beam), followed by $(R+r)_1$ in the second (flange 33B2 cannot blank the reference beam), and $(s)_1$ in the third (flange 33B2 does blank off the sample beam and when it does only sample re-radiation is passed). Next we have $(R+r)_2$, then $(S+s)_2$, then $(S+s)_2$, $(r)_1$. In other words, we have generated exactly the same pair of symmetrical signal sequences as with the arrangement described with reference to FIGS. 2 to 4.

The advantage of the alternative arrangement just described is that the angular phasing of the pre-sample beam control element with the chopper 12 is very easy to set and would require gross interference to upset. Because flange 33B1 cannot blank the sample beam and flange 33B2 cannot blank the reference beam, the shutter may in theory be turned 30 degrees relative to the chopper 12, in either direction from the relationship shown in FIG. 10, without affecting the generation of the signal sequences. In a practical instrument there may be optical reasons, very much associated with a particular design, why such a wide range of adjustment could not be used. Nevertheless, a range of up to 10 degrees either way is easily achieved and this renders the phasing operation a trivial matter indeed.

Another notable advantage made possible by the arrangement described with reference to FIG. 9 and FIG. 10 is the possibility of dispensing with either the mechanical linkage between the presample beam control element and the post-sample chopper or a pair of accurately controlled servo motors and substituting ordinary synchronous motors driven off the 50 Hz AC supply, which can be easily phased within the wide angular tolerance referred to. This does not mean that the arrangement is necessarily to be preferred to the one described with reference to FIGS. 2 to 4, which actually scores in terms of better utilization of the energy available from the radiation source and the fact that the same portion of the source is "seen" by the reference and optical channels; it simply means that the balance of convenience is different, which widens the spectrophotometer design choice.

It would have been superfluous to re-draw the annulus 6D in FIG. 10. However, the phasing tolerance referred to means that in FIG. 10 the equivalent of annulus 6D must be imagined to have been attached to the post-sample chopper 12 and not the shutter 33.

The pre-sample chopper 6 illustrated in FIG. 2 may be used as a post-sample chopper in a double-beam instrument in which the two beams co-exist in time. In fact, if the shutter 33 were removed from the optical layout of FIG. 9, this layout were substituted in FIG. 1 for that shown there for imaging the photometric source 5 at the sample and reference stations (9, 9A), and the post-sample chopper 12 were replaced with the chopper 6, the waveforms of FIG. 6 and FIG. 6A would still apply except that the (s) and (r) elemental portions would be replaced by blanks, i.e. no-signal time intervals. The elemental ratio signal would then correspond to the expression $$\frac{S_1 + S_2}{R_1 + R_2}$$

and there would be no need to distinguish between demarcations, since they would all be of the same kind. In other words, the said expression would be substituted in the flow chart of FIG. 8 where reference is made to (III) and (IV). This further embodiment gains in simplicity but does not allow re-radiation to be accounted for in computing the elemental ratio signal.

There are occasions in the electronic art when a signal handled through digital computational means is assumed to identify with the signal as generated even though it has undergone an analogue-to-digital conversion. This is a reasonable licence and moreover is well understood. Thus, when we refer to "means for establishing an elemental numerator signal combination", for example, the signal combination as such may in fact only exist in its digital homologue set up within the digital computational means.

What is claimed is:

1. A method of producing an electrical output signal expressing the ratio between two quantities, comprising the steps of:
    (a) causing a signal generating means to produce a composite electrical signal in which an elemental portion of a signal component representing one quantity occurs alternately with and in predetermined timed relation to an elemental portion of a signal component representing the other quantity so that said composite electrical signal includes two series of elemental portions,
    (b) reversing periodically the order of occurrence of the elemental portions of one series with respect to the elemental portions of the other series so that the elemental portions of one series are alternately leading and lagging the elemental portions of the other series, and
    (c) computing an elemental ratio of the two quantities in which the numerator and denominator expressions each represent an elemental signal combination, one elemental signal combination including a pair of elemental portions from one series and the other elemental signal combination including a pair from the other series, with the members of each pair producing opposite phase shift variation effects, whereby the effect on the accuracy of said ratio of any phase shift changes introduced by the signal generating means in the elemental portions of both series is substantially cancelled.

2. A method as claimed in claim 1, comprising the step of causing the generation of successive signal sequences each including at least an elemental signal portion from each series, the sequences being separated by time demarcations so that any sequence is symmetrical with the preceding and following sequences, relative to the just passed and the next occurring demarcations, respectively.

3. A method as claimed in claim 2, comprising the step of establishing a numerator elemental signal combination and a denominator elemental signal combination each of which includes the sum of two elemental signal portions belonging to the same series, one of said portions arising in a given signal sequence and the other in a signal sequence that is symmetrical with said given sequence about a demarcation intervening between the two sequences.

4. A method as claimed in claim 3, comprising the steps of causing pulses to be produced which identify each elemental signal portion and using said pulses for controlling the processing of said portions elemental signal through a microprocessor for the purpose of effecting the computation of said elemental ratio.

5. A method as claimed in claim 4, wherein the elemental signal portions caused to be generated by the signal generating means are in analogue form, comprising the step of integrating and digitizing each elemental signal portion before processing it through the microprocessor.

6. A method as claimed in claim 5, wherein the method forms part of a process of infrared, double-beam, ratio-recording spectrophotometry, in which the two quantities are represented by sample transmission (or absorption) and reference transmission (or absorption), respectively.

7. A method as claimed in claim 6, wherein the elemental ratio includes basic numerator and denominator terms expressed by $$\frac{\int S_1 + \int S_2}{\int R_1 + \int R_2}$$

wherein S stands for an elemental sample signal and R for an elemental reference signal and suffixes 1 and 2 denote that the pair $S_1$, $R_1$ form one signal sequence and the pair $R_2$, $S_2$ a following signal sequence, the two sequences being symmetrical.

8. A method as claimed in claim 6, wherein the signal generating means is caused to generate elemental signal portion sequences in which the pattern of notation $$(s)(R+r)(S+s)(r)(S+s)_{sym}(R+r)_{sym}(s)_{sym}$$

is identifiable alternately with the pattern of notation $$(r)(S+s)(R+r)(s)(R+r)_{sym}(S+s)_{sym}(r)_{sym},$$

comprising the step of computing a first expression $$\frac{\int(S+s) + \int(S+s)_{sym} - \int(s) - \int(s)_{sym}}{\int(R+r) + \int(R+r)_{sym} - 2\int r}$$

relative to the first pattern and a second expression $$\frac{\int(S+s) + \int(S+s)_{sym} - 2\int s}{\int(R+r) + \int(R+r)_{sym} - \int(r) - \int(r)_{sym}}$$

relative to the second pattern so that the successive elemental ratios are obtained by alternately applying said first and second expressions, the meaning of the symbols in the said notations and expressions being as follows:
    (s)=elemental sample re-radiation signal
    (R+r)=elemental reference signal plus elemental reference re-radiation signal
    (S+s)=elemental sample signal plus elemental sample re-radiation signal
    (r)=elemental reference re-radiation signal
    sym=suffix identifying an elemental signal that belongs to a signal sequence which is symmetrical to an immediately preceeding signal sequence.

9. Apparatus for producing an electrical output signal expressing the ratio between two quantities, comprising:
    (a) a signal generating means for producing a composite electrical signal wherein an elemental portion of a signal component representing one quantity occurs alternately with, and in predetermined timed relation to, an elemental portion of a signal component representing the other quantity, with the result that said composite electrical signal includes two series of elemental portions;

(b) means forming part of said signal generating means for causing the order of occurrence of the elemental portions of one series with respect to the elemental portions of the other series to be periodically reversed so that the elemental portions of one series are alternately leading and lagging the elemental portions of the other series; and (c) signal processing means responsive to said signal generating means for establishing an elemental numerator signal combination and an elemental denominator signal combination, said elemental numerator signal combination including a pair of elemental portions from one series and the other said elemental denominator signal combination including a pair from the other series, with the members of each pair producing opposite phase shift variation effects, and for ratioing the said combinations and producing an elemental ratio signal, whereby the effect on the accuracy of said ratio of any phase shift changes introduced by the signal generating means in the elemental portions of both series is substantially cancelled.

10. Apparatus as claimed in claim 9, wherein the means for causing a reversal of said order enables successive signal sequences to be generated each including at least an elemental signal portion from each series, the sequences being separated by time demarcations so that any sequence is symmetrical with the preceding and following sequences, relative to the just passed and the next occurring demarcations, respectively.

11. Apparatus as claimed in claim 10, wherein the signal processing means are adapted to establish elemental signal combinations each of which includes the sum of two elemental signal portions belonging to the same series, one of said portions arising in a given signal sequence and the other in a signal sequence that is symmetrical with said given sequence about a demarcation intervening between the two sequences.

12. Apparatus as claimed in claim 11, including timing pulse generating means for producing pulses enabling each elemental signal portion to be identified and microprocessor means forming part of said signal processing means for processing the elemental signal portions and effecting the computation of said elemental ratio in response to said pulses by ratioing the said two signal combinations.

13. Apparatus as claimed in claim 12, wherein the signal generating means is adapted to generate elemental signal portions in analogue form and the apparatus includes means for integrating each elemental signal portion and digitizing the elemental signal portion integral for routing the microprocessor means.

14. Apparatus as claimed in claim 11, wherein said apparatus forms part of a double-beam, ratio-recording, infrared spectrophotometer including as part of the signal generating means a thermal detector and a beam control means arranged to co-operate for producing a sample series of elemental signal portions and a reference series of elemental signal portions, said elemental ratio signal representing the ratio between sample transmission (or absorption) and reference transmission (or absorption).

15. Apparatus as claimed in claim 14, wherein the elemental ratio signal includes basic numerator and denominator terms as expressed by $$\frac{\int S_1 + \int S_2}{\int R_1 + \int R_2}$$

wherein S stands for an elemental sample signal and R for an elemental reference signal and suffixes 1 and 2 denote that the pair $S_1, R_1$ form one signal sequence and the pair $R_2, S_2$ a following signal sequence, the two sequences being symmetrical.

16. Apparatus as claimed in claim 15, wherein the signal generating means is adapted to produce elemental signal portion sequences in which the pattern of notation $$(s)(R+r)(S+s)(r)(S+s)_{sym}(R+r)_{sym}(s)_{sym}$$

comprising an (r) elemental signal portion as a demarcation between two symmetrical sequences is identifiable alternately with the pattern of notation $$(r)(S+s)(R+r)(s)(R+s)_{sym}(S+s)_{sym}(r)_{sym}$$

comprising an (s) elemental signal portion as a demarcation between two other symmetrical sequences, and the signal processing means is adapted to distinguish between the first and the second pattern and compute expression $$\frac{\int(S+s) + \int(S+s)_{sym} - \int(s) - \int(s)_{sym}}{\int(R+r) + \int(R+r)_{sym} - 2\int r}$$

if the first pattern is established and expression $$\frac{\int(S+s) + \int(S+s)_{sym} - 2\int s}{\int(R+r) + \int(R+r)_{sym} - \int(r) - \int(r)_{sym}}$$

if the second pattern is established and produce an elemental ratio signal in each case, the meaning of the symbols in the said notations and expressions being as follows:

(s) = elemental sample re-radiation signal
(R+r) = elemental reference signal plus elemental reference re-radiation signal
(S+s) = elemental sample signal plus elemental sample re-radiation signal
(r) = elemental reference re-radiation signal
sym = suffix identifying an elemental signal that belongs to a signal sequence which is symmetrical to an immediately preceding signal sequence.

17. Apparatus as claimed in any one of claims 14 to 16, wherein the beam control means include a rotary six-sector chopper.

18. Apparatus as claimed in any one of claims 14 to 16, wherein the beam control means include a pre-sample six-sector chopper adapted to co-operate with a post-sample six-sector chopper.

19. Apparatus as claimed in any one of claims 14 to 16, wherein the beam control means include a pre-sample six-sector chopper having two reflecting, two opaque and non-reflecting, and two straight-through-air sectors, one opaque non-reflecting sector occurring between two reflecting sectors and the other between two straight-through-air sectors, said beam control means further including a post-sample six-sector chopper having three reflecting sectors alternating with straight-through-air sectors, the pre-sample chopper being integral in motion with the post-sample chopper, with the choppers angularly phased so that two reflecting sectors of the post-sample chopper register with two straight-through-air sectors of the pre-sample chopper and the remaining reflecting sector registers with an opaque non-reflecting sector located between two reflecting sectors of the pre-sample chopper.

20. Apparatus as claimed in any one of claims 14 to 16, comprising a rotary six-sector post-sample chopper having three reflecting sectors alternating with straight-through-air sectors and a pre-sample rotary shutter having two symmetrical shutter lobes, one lobe being adapted to intercept the reference beam when the sample beam is "seen" by the thermal detector and the other to intercept the sample beam when the reference beam is "seen" by the thermal detector, the six-sector post-sample chopper and the two-lobe rotary shutter being integral in motion and the lobes extending over such angle and being so phased with respect to the sectors that a large error in phasing may be tolerated without affecting the proper generation of the sample and reference elemental signal portions.

21. Apparatus as claimed in claim 15, wherein the beam control means include a rotary six-sector post-sample chopper having two reflecting, two opaque and non-reflecting and two straight-through-air sectors, one opaque non-reflecting sector occurring between two reflecting sectors and the other between two straight-through-air sectors, the sample and reference beams coexisting in time.

* * * * *